United States Patent [19]

Suzuki et al.

[11] 3,964,648

[45] June 22, 1976

[54] TONER SUPPLY DEVICE FOR COPYING APPARATUS

[75] Inventors: Shigeru Suzuki; Minoru Suzuki, both of Yokohama, Japan

[73] Assignee: Ricoh Co., Ltd., Japan

[22] Filed: June 20, 1975

[21] Appl. No.: 588,801

[30] Foreign Application Priority Data

June 28, 1974 Japan .............................. 49-73244

[52] U.S. Cl. .................................. 222/333; 74/112; 222/410

[51] Int. Cl.² .......................................... G01F 11/20

[58] Field of Search ........... 222/406, 333, 410, 414, 222/369, 336; 74/100 R, 100 P, 112

[56] References Cited

UNITED STATES PATENTS

| | | | |
|---|---|---|---|
| 2,054,338 | 9/1936 | Piper | 222/333 |
| 2,650,476 | 9/1953 | Favre | 74/112 X |

*Primary Examiner*—Allen N. Knowles
*Assistant Examiner*—Hadd Lane
*Attorney, Agent, or Firm*—McGlew and Tuttle

[57] ABSTRACT

An apparatus for supplying a granular material particularly a toner in a copying apparatus, comprises a material container which has a cylindrical interior wall with a discharge opening above the bottom of the wall on one side thereof. A rotatable scooping member in the form of a wire member having an elongated portion extending substantially parallel to and closely spaced from the interior wall along the longitudinal axis of the container rotates in the container and causes an agitation of the material so that it remains uniform and does not adhere to a wall of the container and in addition during its rotation it discharges a portion of the material outwardly through the discharge opening. The rotatable movement of the rotatable scooping member is effected through a driving transmission which includes a rotatable drive member having a leaf spring secured at its one end thereto and which projects radially outwardly. The free end of the leaf spring drives a rotatable member which is connected to the rotatable scoop to cause its rotation. During the movement of the spring the outer portion of the free end engages against a holding pin to cause the spring to flex until the rotation is such that the spring is suddenly released by the holding pin. This sudden release causes the spring to rapidly propel the scoop member ahead of it and to cause it to move rapidly and discharge the material picked up on its surface outwardly through the discharge opening. The holding pin is advantageously located so that the spring contacts the holding member just after it moves out of the material of the container toward the upper last quarter of its movement on one side of the container in a direction toward the opposite side having the discharge opening. In this manner the spring causes the scoop member to accelerate rapidly and to cause the material picked up thereby to become dislodged and move through the discharge opening.

6 Claims, 11 Drawing Figures

TONER SUPPLY DEVICE FOR COPYING APPARATUS

BACKGROUND OF THE INVENTION

1. Field of the invention

This invention relates in general to material dispensing devices and in particular to a new and useful device for dispensing a toner material in a copying apparatus.

2. DESCRIPTION OF THE PRIOR ART

In electronic copying apparatus an electrostatic latent image is formed by exposing a photosensitive surface to an optical image of a graphical material to be duplicated in the exposing step and it is developed into a visible image by using a developing agent which is a mixture of toner powder and carrier particles. The production of a visible image of uniform density makes it necessary to maintain the ratio of the toner to the carrier in a predetermined range. Since the toner is consumed by adhering to the electrostatic latent image in the developing step it is necessary to provide means for suppling the toner to the developing surface during developing. In the known types of toner dispensing apparatus which are used with copiers the toner is dispensed from the lower end of a supply container through a cylindrical passage which contains a rotatable slotted roller or brush roller. A disadvantage in this construction is that the material is dispensed in unequal quantities throughout the entire length of the rollers and in addition the characteristic of the toner and the feeding thereof is uneven. This condition is aggravated by the addition of toner to the supply container and the tendency of the toner to collect into compact masses. When the toner is not dispenzed smoothly and uniformly along the entire length of the discharge opening there is a tendency for the portion remaining in the container to form into compact masses on each container wall and the material becomes stuck at such locations. In order to avoid this it has been proposed to provide means for vibrating the supply container in order to cause the material to become dislodged from the walls. Such an arrangement however is expensive and is difficult to maintain in operating condition.

SUMMARY OF THE INVENTION

In accordance with the present invention there is provided a device for uniformly dispensing a toner for a copying apparatus which operates without any collection of the toner into compact masses and insures the uniform dispensing of the toner along the length of the apparatus and further insures that the material of the toner is uniform and is not subjected to the formation of compact masses.

In accordance with the invention there is provided a rotatable toner scoop memeber in the form of a wire having a portion which extends longitudinally through a container having a cylindrical interior wall and a discharge at one side thereof above the bottom. The scoop member extends along the wall in closely spaced relationship hereto and it is rotated to cause the member to pick up the material and to move it to a position in which it is discharged outwardly through the side opening. To facilitate this movement the transmission means for driving the rotatable scoop member comprises a leaf spring which is rotated by a rotatable drive member which has a free end which moves against a holding pin. The holding pin prevents further complete movement of the pin and causes its flexing and bending to build up its spring force. When the bending is carried out to a predetermined degree the spring moves beyond the holding pin and as it does so it attains a rapid acceleration due to the build up of its spring force which acts on the rotatable scoop member and causes its rapid acceleration directly before it passes through an arc adjacent the discharge from the container. This action causes the material on the scoop member to be propelled by centrifugal force outwardly through the discharge opening and into the copying apparatus where it is employed.

Accordingly it is an object of the invention to provide an improved device for supplying a toner in a copying apparatus which includes a rotatable scoop member having a portion which extends parallel to an interior cylindrical wall of the toner material supply and which rotates through a path so that a portion of the scoop member is closely adjacent the interior wall and is moved through the material and upwardly and outwardly therefrom to cause the discharge of the material outwardly through an upper opening in the container on one side thereof, and wherein the scoop member is driven by a resilient member which engages against a pin during the movement thereof to build up a spring force which acts upon the scoop member to rapidly accelerate it directly before it approaches the discharge opening so that when it moves through the discharge opening the material thereon is propelled outwardly through the opening.

A further object of the invention is to provide a copying device with a toner dispensing apparatus and to provide a material dispensing apparatus which are simple in design, rugged in construction and economical to manufacture.

The various features of novelty which characterize the invention are poined out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PRIOR ART OF FIGS. 1 AND 2

Figure 1:
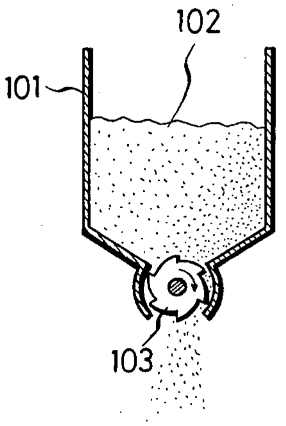
FIG. 1 is a transverse sectional view of a toner supply device in accordance with the prior art.
Figure 2:
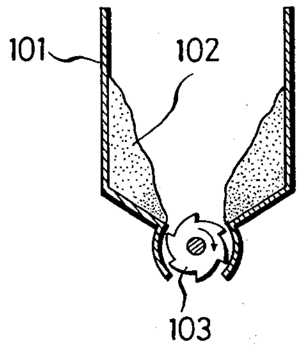
PRIOR ART FIG. 2
FIG. 2 is a view of the device of the prior art shown in FIG. 1 indicating the formation of the toner material into compact masses.

Referring to FIGS. 1 and 2 the prior art device comprises a hopper or supply container 101 carrying toner 102. A slotted roller or brush roller 103 is rotatably mounted in a cylindrical discharge space at the bottom of the hopper 101. The roller rotation causes the dispensing of the toner and its dropping gradually into a developing agent chamber. In the toner supply device of the prior art construction it is required that the quantity of the toner be supplied uniformly throughout its length that is the length of the rollers 103. It is also required that a predetermined relation should be maintained between the angle of rotation of the roller and the quantity of the supply toner. The toner in the hopper should be replenished smoothly and collecting of the toner in the hopper into the compact masses should be prevented. However in the case of the prior art constructions shown in FIGS. 1 and 2 the flow of the toner does not take place smoothly but only in the portion of the toner which is disposed immediately above the roller 103. There is a tendency for the remaining toner to collect against the walls of the hopper as shown in FIG. 2 and the only known means of preventing such a defect is to provide means for agitating the hopper to cause it to vibrate and to cause the material to become dislodged.

GENERAL DESCRIPTION OF THE PREFERRED EMBODIMENTS

Referring to the drawings in particular the invention embodied therein in FIGS. 3 and 5 to 7 comprises an apparatus for supplying toner material in a copying machine generally designated 50 which includes a drum 52 over which the material to be copied is passed an d with a rotatable counter roller 54 being located in spaced relationship below the drum 52 in a developing chamber generally designated 1 which is formed at the interior of a housing 3. Toner material 15 is shown in the developing chamber 1 both before it has been circulated by the rotation of the roller 54 having magnets 56 and after a portion of it is circulated back into the developing chamber 1.

In accordance with the invention there is provided an apparatus for dispensing toner 15 from a cylindrical supply container 6 having an interior cylindrical wall 2 with a lower portion which is filled with the toner 15. The container 6 is provided with a discharge opening 16 above the bottom thereof on one side which is arranged in a first quadrant of the cylindrical container 6 beyond the vertical in the direction of rotation of the arrow 58. The toner material dispensing device includes a scoop member or scooping member 11 which is of wire form and includes a portion **11*a* which extends parallel to and is closely spaced inwardly from the interior cylindrical wall 2 and which extends along a considerable portion of the length of the container 6 for example the entire length thereof. The material feed means which is generally designated 7 includes the rotatable scoop member 11** which is affixed to a shaft

Figure 4:
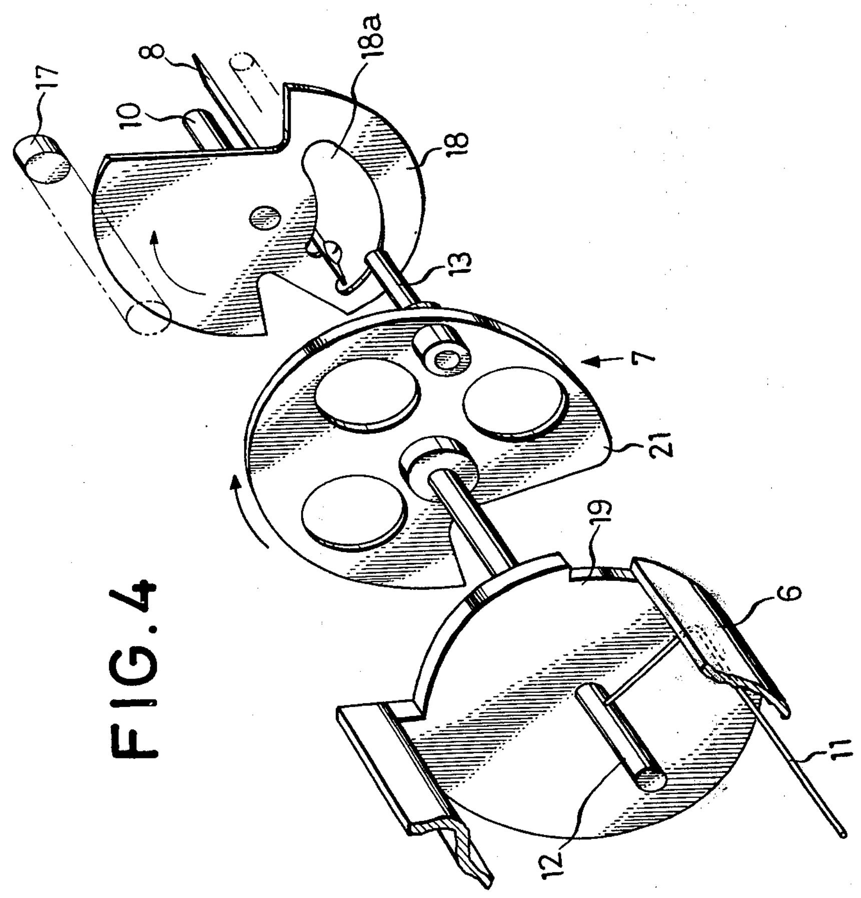
FIG. 4 is an exploded perspective view of one embodiment of a drive mechanism for operating the toner scoop constructed in accordance with the invention and shown in FIG. 3.

12 which is rotated in the direction of the arrow 58. The drive means 7 also includes means to rotate the shaft 12 in the embodiment shown in FIG. 5 comprises a drive shaft 10 having a drive disc 18 affixed thereto of a construction shown in FIG. 7b which has a large size shaped opening 18a through which a drive pin 13 extends which is connected to a follower plate 21. The follower plate 21 is in turn connected through a pin 20 to a connecting plate 19 which is affixed to the feed shaft 12 for rotation therewith. The connecting plate 19 and the pin 20 can be eliminated if the follower plate 21 is directly cojnected to the feed shaft 12 which for example may be the arrangement as shown in FIG. 4.

The drive shaft 10 is rotated by a known drive mechanism such as an electric drive and it causes the rotation of the spring 8 which has an outer or free end portion which engages against the pin 13 and transmits the rotational drive force to the follower plate 21 and the feed shaft 12. In the embodiment shown particularly in FIG. 5 the feed shaft 12 and the drive shaft 10 are arranged coaxially with the center axis being at the center of the cylindrical interior wall 2 of the container 6. When the drive shaft 10 is rotated the plate spring 8 rotates therewith to push the drive pin 13 and to thereby cause the follower plate 21 to rotate. Holding pin 17 is arranged as best seen in FIGS. **7*b* so that it hinders the passage of the outer end of the spring 8 and causes its flexing into the bent position shown in FIG. 7*c* and cause a build up of a spring force therein. When the drive disc 18 moves beyond the position shown in FIGS. 7c the end of the spring 8 is released suddenly to cause it to move to the dotted line position shown and to rapidly accelerate follower plate 21 and hence the feed shaft 12 and the feeding scoop 11 so that it is moved instantaneously from the position shown at 13*a* in dotted lines to the position shown in 13*b* in dotted lines in FIG. 7*c*. The pin 17 is advantageously located so that it acts upon the scoop member 11 to accelerate it when the scoop member is at position A shown in FIG. 3 at which it is above the material in the container 6 and is moving through an arc of the last quadrant up to the vertical so that acceleration of the scoop member takes place at the location B where the scoop member portion 11A is ready to move through a portion of the arc directly before the discharge opening 16 to the location C to thereby cause the material which is picked up on the scoop member portion 11A to be hurled outwardly through the discharge opening 16.**

In the embodiment shown the container 6 provides a storing container portion 5 which is regularly resupplied with toner. The scoop member portion 11A extends substantially parallel to the feed shaft 12. When the drive shaft 10 is rotated the feed shaft 12 rotates to cause the scoop member 11 to move its longitudinally extending portion 11A along the inner wall surface 2 of the toner storing chamber 5. The toner 15 which is stored in the chamber 5 is thus agitated and any tendency toward the compacting of the material into masses is prevented. Only a small quantity of toner which was disposed between the scooping member portion 11A and the surface of the interior wall 2 would remain and the rest of the toner would all be discharged from the chamber 5 by the action of the scooping member and by the action of centrifugal forces which are generated by the action of the spring 8.

Figure 3:
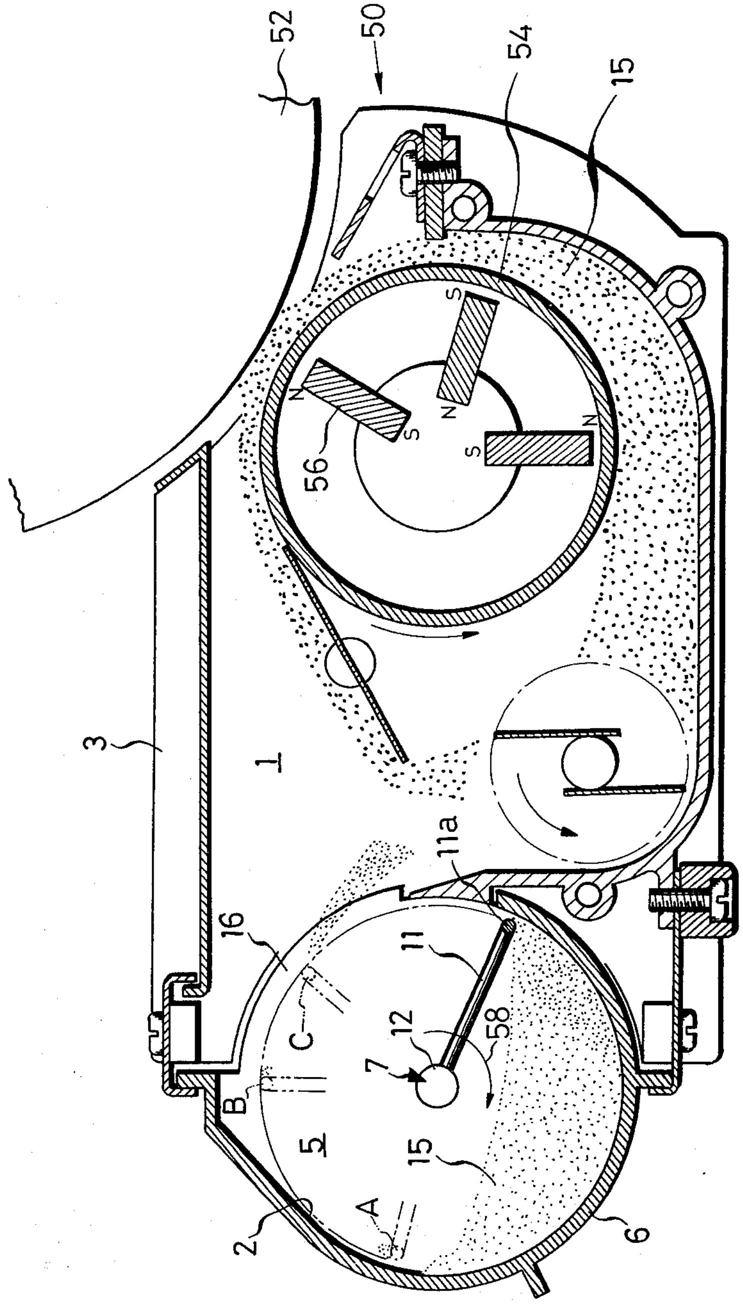
FIG. 3 is a partial sectional view of a copying device having a toner supply apparatus constructed in accordance with the invention.

When the scoop member 11 has moved through the toner material 15 and emerges therefrom into the position shown in FIG. 3 by A, a considerable large quantity of toner 15 is disposed on the scooping member 11 as shown in FIG. 6a. It will be seen however that there is a certain degree of variation in the quantity of the toner from portion to portion lengthwise along the scoop member portion 11A. More toner than necessary will gradually drop out while the scoop member 11 moves and the pile of toner will level off. When the longitudinal portion 11A of the scoop member reaches the position B shown in FIG. 3 in which it is located at the top of its movement, the pile of toner on the portion 11A becomes substantially flat as shown in FIG. 6*b*.

The toner 15 which is scooped up by the scooping member 11 is released by the centrifugal forces produced by the rotation of the meber 11 and by the additional forces generated by the temporary retention and later release of the spring 8. Examination of the quantity of toner released from the toner storing chamber 5 each time the scooping member makes one complete revolution shows that although there is a variation in the quantity of toner fed into the developing chamber 1 depending on the position in which the toner is released from the scooping member 11, the quantities contain a more or less average value if the operations are repeatedly performed. Thus it has been found that the variation in quantity of toner released due to the position in which it is released is plus or minus 20%. The rotation of the scooping member 11 is effective to agitate the stock of toner and is also effective to break down into individual particles any toner which has collected into compact masses. Thus the toner supplied to the developing chamber 1 is uniformly scattered in particulate form.

The spring 8 which is deflected by the holding pin 17 is capable by its deflection to store energy which is suddenly released to cause a rapid advance of the pin 13 and the rotation of the shaft 12 and advance of the scoop member 11. The action is similar to an impact acceleration and the toner is positively discharged by this impact and moved toward the developing chamber 1, when the scooping member reaches the position C shown in FIG. 3.

Figure 8:
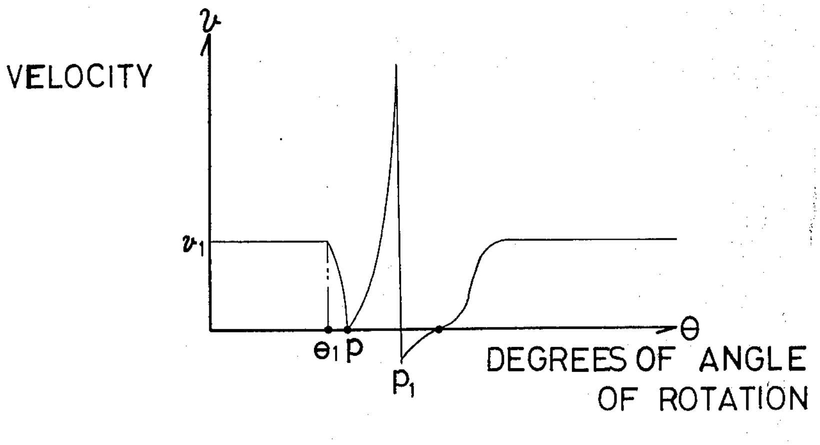
PRIOR ART FIG. 8
FIG. 8 is a graph indicating the variations in velocity of the scooping member during its rotation.

As shown in the graph of FIG. 8 it can be seen that the scooping member 11 rotates at a constant velocity $V_1$ and gradually decelerates because the drive force exerted thereon is released at the point $\theta_1$ at which the forward end of the spring 8 abuts against the pin 17 and finally stops at a point P which corresponds to the position C in FIG. 3. Slightly before or after the scooping member 1 stops, plate spring 8 is released from engagement with the holding pin 17 and the energy of deflection stored in the plate spring 8 is instantaneously released so that the plate spring 8 impinged on the drive pin 13. By this impact the scooping member 11 is suddenly accelerated as indicated at $P_1$ and the drive pin 13 strikes an edge of an opening 18*a* in the drive disc 18 and rebounds to a stationary position. During this time the toner is released from the scooping member 11 by centrifugal forces. Thereafter the drive pin 13 is pushed again by the plate spring 8 and the rate of its movement gradually increases till it reaches the constant velocity $Z_1$. The scooping member 11 continues to move at the constant velocity $V_1$ till the plate spring is brought into abutting engagement with the pin 17 or the drive shaft 10 stops rotating. In FIG. 8 the rotational position of the scooping member 11 is designated in angles along the axis of the abscissa and the velocity is indicated along the axis of the ordinate.

The drive shaft 10 is intermittently driven through one rotation clutch means at the number of revolutions which is controlled in proportion to the number of duplicates to be made or the area of the graphical material to be copied. That is the scooping member 11 is also caused to revolve intermittently. In controlling the number of revolutions of the scooping member 11, it is possible to rotate it continuously at low speed without using clutch means when a copying operation is performed, or to control its rotation in accordance with a signal from the toner concentration detection means. It is thus possible to select any control method which is deemed optimal for keeping constant the concentration of a toner in a developing agent.

Figure 5:
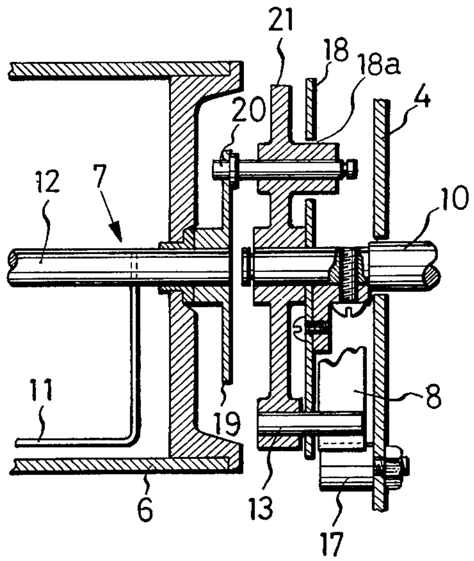
FIG. 5 is a partial axial sectional view of the toner scoop drive mechanism for the embodiment shown in FIG. 3.
Figure 6:
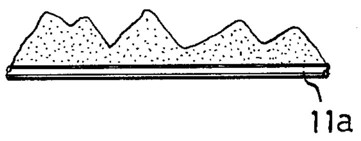
FIG. 6*a* is a partial side elevational view showing the loading of the scoop member.
FIG. 6*b* is a view similar to FIG. 6*a* but showing a loaded scoop member in an advanced position.
Figure 6:
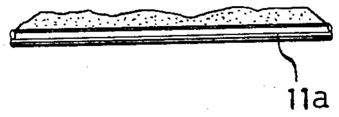
Figure 7:
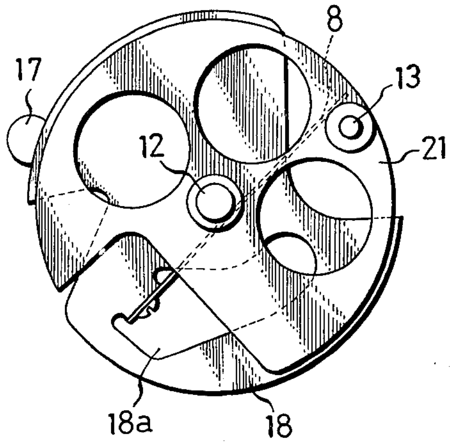
FIG. 7*a* is an end elevational view of the followef plate and associated scoop member drive mechanism.
FIG. 7*b* is an end elevational view of the drive disc showing the drive spring which is engaged by the holding pin.
FIG. 7*c* is a view similar to FIG. 7*b* showing the drive plate in an advanced rotatable position.
Figure 7:
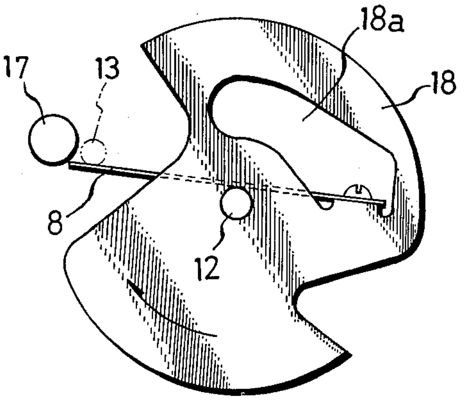
Figure 7:
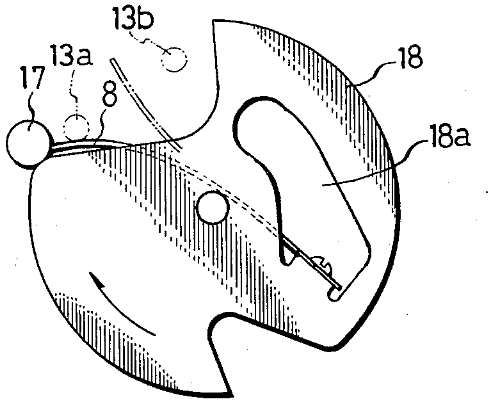

As can be seen in FIGS. 3 and 5 it is possible to readily replenish the stock of toner in the toner storing chamber 5 by feeding the toner through the opening 16 and by withdrawing the toner container 6 axially away from the drive section or by opening the upper cover of the frame. When the stock of toner in the storing chamber is replenished, additional toner is preferably delivered uniformly with respect to the axis of the storing chamber 5. However since the scooping member 11 of the device performs an agitating action the toner may be delivered to the chamber 5 in any manner desired because the pile of toner levels off as the scooping member revolves even if the toner is supplied unevenly to various portions of the chamber 5. This eliminates the need to provide means for evenly distributing the toner to storing chamber 5. When it is desired to keep uniform the quantity of toner in the storing chamber by using this device, a problem will arise in effecting uniform delivery of the toner unless the toner container 6 is disposed horizontally. However, this problem can be obviated by first effecting adjustments to position the toner container 6 horizontally. This operation is easier to perform than the operation of keeping the delivery of toner uniform each time the stock of toner in the storing chamber is replenished.

With the inventive device it is possible to supply the toner to a developing chamber which is disposed in a side by side relation with the toner supply device not beneath the toner supply device as has heretofore been the case in the prior art. This gives increased latitude to the layout of a copying apparatus and permits its overall compact construction.

While specific embodiments of the invention have been shown and described in detail to illustrate the application of the principles of the invention, it will be understood that the invention may be embodied otherwise without departing from such principles.

What is claimed is:

1. In a copying apparatus of a type in which images are fixed on a sheet of copy by magnetically positioning a toner material, the improvement comprising a material container having a cylindrical interior wall with a discharge opening above the bottom of said wall on one side thereof, a rotatable scooping member having a portion extending longitudinally through at least a portion of said container adjacent said interior wall and being rotatable around said container in closely spaced relationship to said wall to pick up material from said container and discharge it through said discharge opening, and drive means connected to said scooping member to rotate said scooping member and including a rotatable drive member having a resilient transmission portion acting on said scooping member to rotate it, and a holding member disposed in the path of movement of said resilient transmission portion and temporarily blocking the movement thereof to bend said resilient member to effect the build up of resilient force therein whereby the resilient member becomes clear of said blocking member to release said resilient force which acts in the direction of rotation of said scooping member to accelerate it at a location where its rotation approaches the discharge opening and to cause the material picked up by the longitudinally extending portion thereof to be hurled through the discharge opening.

2. In a copying machine according to claim 1, wherein said drive means and rotatable drive member includes a drive disc, said resilient transmission portion comprising a plate spring carried by said drive disc and extending substantially radially in respect to the axis of rotation thereof.

3. In a copying machine according to claim 2, including a follower member having a pin portion acted upon by said drive disc and connected to said scooping member to rotate said scooping member.

4. In a copying machine according to claim 3, wherein said drive disc has an arcuate slot, said follower member having a pin at a spaced location from the center of rotation thereof extending through said slot and engaged by said spring, said spring driving said follower plate through said pin.

5. In a copying apparatus according to claim 4, wherein said drive means includes a drive shaft carrying said drive plate, said follower plate having a transmission pin, a feed shaft carrying said rotatable scooping member having a plate portion connected to said transmission pin.

6. An apparatus for supplying a granular material particularly a toner material in a copying apparatus, comprising a material container having a cylindrical interior wall with its discharge opening above the bottom of said wall on one side thereof, a rotatable scooping member having a portion extending longitudinally through at least a portion of said container adjacent said interior wall and being rotatable around said container in closely spaced relationship to said wall to pick up material from said container and discharge it through said discharge opening, and drive means connected to said scooping member to rotate it including a rotatable drive member having a resilient spring extending substantially radially to the axis of rotation thereof, a following member engaged by said spring and rotated thereby and connected to said rotatable scooping member to rotate said scooping member, and a holding member disposed in the path of rotation of said spring and causing deflection of said spring as said drive member is rotated to cause the end of said spring to flex until it is cleared of said holding member and to act with force thereafter against said pin to rapidly accelerate said pin and to cause said scooping member to be rapidly accelerated just as it moves before said discharge opening to hurl the material picked up thereby outwardly through the opening.

* * * * *